E. A. PATERSON.
ROAD AND PROCESS OF MAKING IT.
APPLICATION FILED JAN. 20, 1911.
996,513.
Patented June 27, 1911.
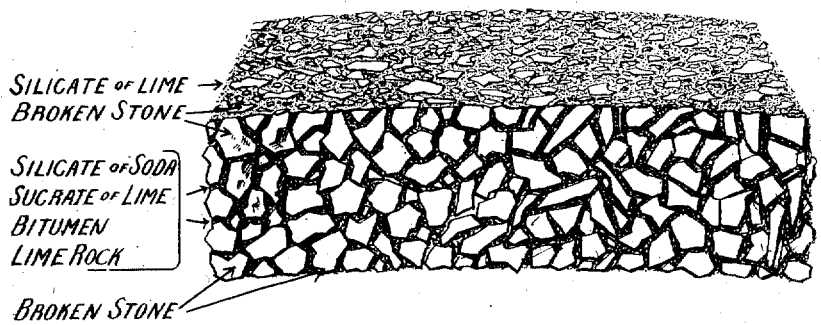
WITNESSES
INVENTOR
Edward A. Paterson,
his Attorneys

UNITED STATES PATENT OFFICE.

EDWARD ALFRED PATERSON, OF PORT ARTHUR, ONTARIO, CANADA.

ROAD AND PROCESS OF MAKING IT.

996,513.

Specification of Letters Patent. Patented June 27, 1911.

Original application filed June 20, 1910, Serial No. 567,959. Divided and this application filed January 20, 1911. Serial No. 603,689.

*To all whom it may concern:*

Be it known that I, EDWARD ALFRED PATERSON, a subject of the King of Great Britain, and at present residing at Port Arthur, in the Province of Ontario, Canada, have invented certain new and useful Improvements in Roads and Processes of Making Them, of which the following is a specification.

According to this invention macadam and other roads are made in an improved way by the use of new materials applied in a novel manner.

Broadly stated the invention consists in using in the construction of roads materials which, as the road wears away and they are exposed to the atmosphere, will undergo certain chemical changes that render them harder, more durable and better binding agents for the rock or gravel with which they are associated.

The accompanying drawing is a perspective view of a section of road, the preferred composition of the road being specified on the drawing.

In carrying out my invention I provide a solution consisting of sucrate of lime and an alkaline silicate, such as silicate of soda, which I mix with carbonate of lime or other limerock, or a combination of limerock and phosphate of alumina rock, to produce a matrix for binding the crushed rock or gravel, or other like material or road metal ordinarily used in the construction of roads. When the solution of sucrate of lime and silicate of soda is mixed with the limerock and spread into a layer the crushed rock, gravel or like material, is spread over it and rolled down in such manner as to cause the rock or gravel to sink and the matrix to rise and until grout appears on the surface, which latter is swept over the surface to fill all remaining interstices.

Below the surface the sucrate of lime and the silicate of soda remain as such in the matrix, while on the surface of the matrix the carbonic acid of the atmosphere decomposes the silicate of soda forming carbonate of soda and gelatinous silica, which latter combines with the sucrate of lime forming the hard and durable silicate of lime which is not easily washed away and which more effectively and durably binds the rock or gravel together. The carbonate of soda and the sugar go to waste.

The sucrate of lime and silicate of soda below the surface of the road and not exposed to the atmosphere remain undecomposed and uncombined until the road is sufficiently worn to bring them within the range of atmospheric influences, when silicate of lime is again produced.

The road thus constructed may be watered with a solution of calcium chlorid which is decomposed, the calcium combining with the gelatinous silicate formed in the manner before described, to produce silicate of lime.

In some cases I may make a road by first forming a bed of suitable material in any suitable way, and I then cover the bed with finely crushed limestone or the like mixed with a solution of sucrate of lime, silicate of soda and a suitable quantity of a bituminous compound which will make the surface somewhat elastic and smooth. The presence of the sucrate-alkaline solution largely prevents the volatilization of the volatile compounds in the bitumen. I may also form paving blocks by combining a solution of sucrate of lime and an alkaline silicate with limestone or the like and molding or shaping the compound to suitable form.

The lime present in the road combines with water and the carbonate of soda formed in the manner above described to produce a cement which assists in binding the gravel or broken rock in the matrix.

When the road is formed in the manner above described the matrix hardens throughout sufficiently to hold the crushed rock or gravel in place but the surface of the road where silicate of lime is formed is particularly hard and durable and is not easily washed away.

In my Patent No. 987,597 of March 21, 1911, I have claimed a solution for use in making roads, comprising sucrate of lime and an alkaline silicate, and I have claimed a method of producing such solution.

It will be understood that some or all of the materials employed may be mixed before they are laid on the road bed or they can be mixed while being laid on the road bed.

I claim as my invention:

1. A road, composed of limerock, sucrate of lime, an alkaline silicate and crushed rock or gravel.

2. A road, consisting of sucrate of lime, an alkaline silicate, crushed rock or gravel, and bitumen.

3. A road, consisting of sucrate of lime an alkaline silicate and a road metal.

4. The herein described method of forming a road, which consists in preparing the road bed, mixing in suitable proportions sucrate of lime and an alkaline silicate and laying said mixture with suitable road metal on the road bed, thus producing calcium silicate on the exposed surface of the road while the sucrate of lime and the alkaline silicate below the surface remain substantially unchanged.

EDWARD ALFRED PATERSON.

Witnesses:
LLOYD B. WYHT,
A. M. PARKINS.